United States Patent [19]

Moss et al.

[11] Patent Number: 5,307,684
[45] Date of Patent: May 3, 1994

[54] STOP MECHANISM FOR A DIAPHRAGM PRESSURE TRANSDUCER

[75] Inventors: Robert A. Moss, Holland; Jack C. Kitchens, II, Kenmore, both of N.Y.

[73] Assignee: Viatran Corporation, Grand Island, N.Y.

[21] Appl. No.: 893,193

[22] Filed: Jun. 2, 1992

[51] Int. Cl.⁵ .............................................. G01L 9/02
[52] U.S. Cl. ............................................ 73/716; 73/706; 73/717; 73/723
[58] Field of Search ............... 700/715, 716, 717, 718, 700/719, 720, 721, 722, 723, 724, 725, 726, 727, 728, 747, 749, 750; 73/37, 39, 146.8, 706; 338/4

[56] References Cited

U.S. PATENT DOCUMENTS

| | | |
|---|---|---|
| 1,169,250 | 1/1916 | Fulton . |
| 2,708,908 | 5/1955 | Taylor . |
| 2,731,977 | 1/1956 | McGowen, Jr. . |
| 3,183,672 | 5/1965 | Morgan . |
| 3,347,272 | 10/1967 | Rast . |
| 3,431,985 | 3/1969 | Bowen . |
| 4,111,056 | 9/1978 | Mastromatteo . |
| 4,172,388 | 10/1979 | Gabrielson . |
| 4,543,832 | 10/1985 | Van Over . |
| 4,590,818 | 5/1986 | Teraoka . |
| 4,640,135 | 2/1987 | Kästel et al. ................. 73/716 |
| 4,668,889 | 5/1987 | Adams . |
| 5,209,107 | 5/1993 | Grudzien et al. .............. 73/715 |
| 5,212,989 | 5/1993 | Kodama et al. ................ 73/706 |

*Primary Examiner*—Richard E. Chilcot, Jr.
*Attorney, Agent, or Firm*—Ratner & Prestia

[57] ABSTRACT

A pressure transducer for measuring the pressure of a fluid comprising a housing having a cavity. A diaphragm capable of displacement is located within the cavity, dividing the cavity into a first and second chamber. The first chamber is capable of receiving a fluid to be measured, typically a liquid or a gas, while the second chamber contains a liquid such as a silicon oil. The second chamber also contains a gas and means for measuring the displacement of the diaphragm. Upon pressure being exerted against the diaphragm from the fluid, the diaphragm displaces against the liquid and gas, compressing and dissolving the gas as pressure is increased. Displacement of the diaphragm is measured by a measuring device, such as a strain gauge. When the gas is fully dissolved, further movement of the diaphragm is limited by the compressibility of the liquid.

13 Claims, 5 Drawing Sheets

STOP MECHANISM FOR A DIAPHRAGM PRESSURE TRANSDUCER

FIELD OF THE INVENTION

The present invention relates to a hydraulic stop mechanism for use with a pressure sensing transducer and more particularly, for a pressure sensing transducer which measures pressure through the displacement of a diaphragm.

BACKGROUND OF THE INVENTION

In many hydraulic applications it is necessary to monitor the pressure of the hydraulic system. Over-pressure conditions can be a constant hazard in certain hydraulic applications such as stamping and forging operations. In these operations, dies are driven in large presses to form and forge metal or plastic parts. Pressure transducers are used in the hydraulic system to monitor the loads on the equipment to insure proper and safe operation of the system. Over-pressure conditions of hydraulic systems can inadvertently be generated from very high transient pressure waves (or spikes) caused by the large pumps, cylinders and fast acting valves on these hydraulic machines. The spikes are usually of an unpredictable magnitude and duration, but pressures of two to ten times the expected pressure range are not uncommon.

Prior pressure transducers typically provided 150% of rated range protection against calibration damage (zero offset). Up to 500% protection was available before destruction of the pressure sensing device through rupture of the sensing diaphragm. Other prior systems increased the safe operating range of the pressure sensing transducer through various mechanical devices, such as set screws. Set screws limit the displacement of the diaphragm and increase the protection against calibration damage up to two to three times that of the rated range. The bursting pressure for the diaphragm is usually not increased by these mechanical devices. The use of set screws in particular, can actually decrease the bursting pressure limit due to the high stress area of the screw head.

SUMMARY OF THE INVENTION

A pressure transducer is disclosed for measuring the pressure of a substance, typically a liquid or gas, under pressure. A pressure transducer in accordance with the present invention comprises a housing having a cavity which is divided into two chambers by a flexible diaphragm. The first chamber contains a fluid, the pressure of which is being measured. The second chamber contains a liquid, such as a silicone oil. A volume of gas is contained within the second chamber along with the liquid. Also contained in the second chamber are means for measuring the displacement of the diaphragm and hence the pressure of the fluid being measured. These means may be in the form of strain gauge sensors or electrical pickups with wires extending out of the pressure transducer to a device for interpreting the signals.

Upon application of pressure to the diaphragm from the fluid, the diaphragm displaces against the liquid, dissolving the gas into the liquid as pressure increases. When the gas is fully dissolved, only the liquid is left to compress. At this point, the diaphragm is essentially stopped, only able to move to the extent the liquid can be further compressed.

Such a system serves to protect the diaphragm from irreparable damage due an over-pressure condition while allowing accurate measure of pressure. The liquid in the second chamber molds against the diaphragm, preventing deformation or rupture.

BRIEF DESCRIPTION OF THE FIGURES

The invention will now be described by way of non-limiting example, with reference to the attached drawings in which.

DETAILED DESCRIPTION OF THE INVENTION

Figure 1:
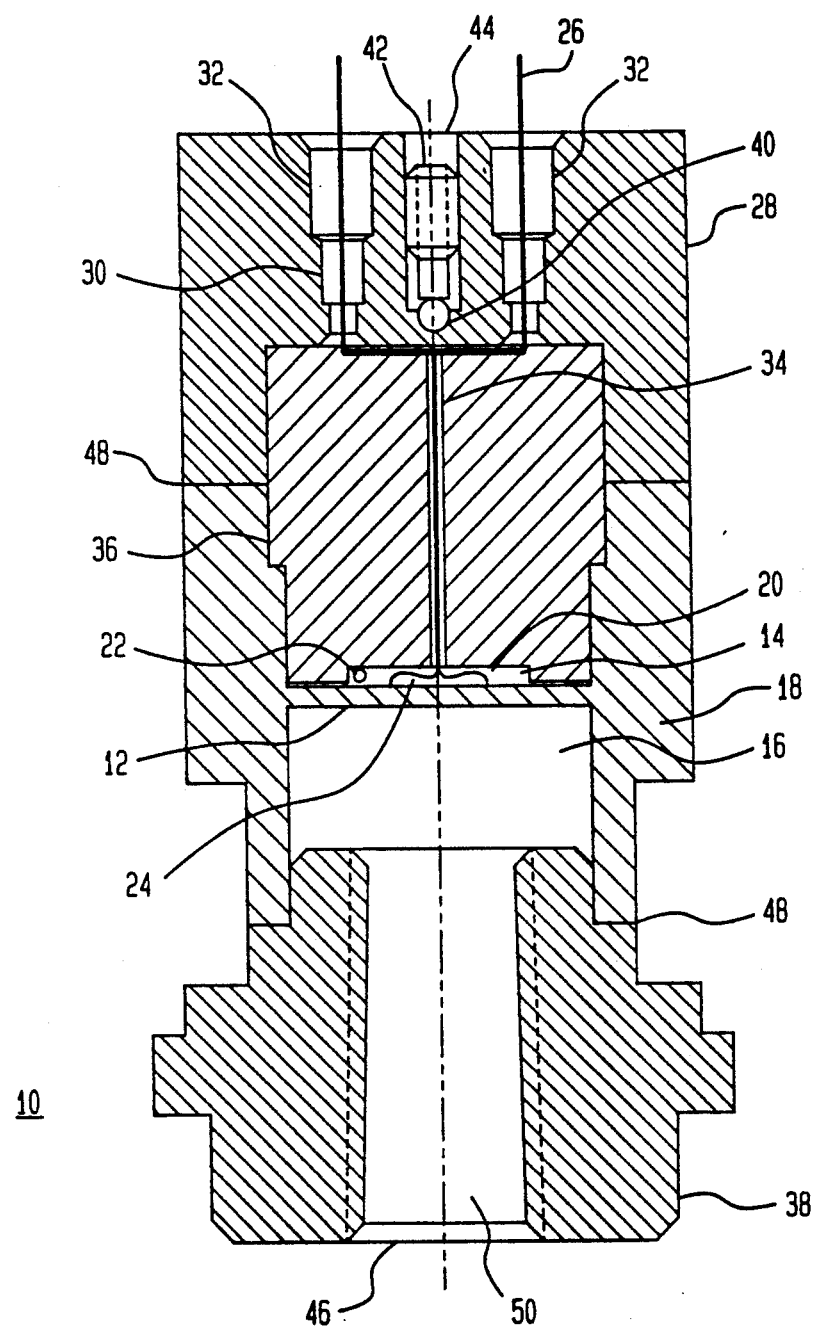
FIG. 1 is an exemplary embodiment of a strain gauge pressure sensing transducer with hydraulic stop mechanism in accordance with the present invention.

There is shown in FIG. 1 an exemplary embodiment of a strain gauge pressure sensing transducer 10. Pressure transducer 10 comprises a flat diaphragm 12 positioned between a first chamber (pressure chamber) 16 and a second chamber (sensor chamber)14. First chamber 16 receives a fluid 50, the pressure of which is being measured, through pressure port 46. Diaphragm 12 is also positioned between the walls of sensor body (pressure vessel)18. Chamber 14 contains a hydraulic fluid or liquid 20, such as silicone oil and a volume of gas or gas bubble 22, such as an air bubble, under a vacuum. Located in sensor chamber 14, behind diaphragm 12 are pressure sensors 24, such as strain gauges which measure the displacement of diaphragm 12. Strain gauges 24 are connected to an outside monitoring device such as a display device or microprocessor (not shown) via wires 26.

Wires 26 are fed through pressure containment cap 28 via feed thrus 30 fitted in feed thru passages 32. Feed thrus 30 can be made of a material which provides strong sealing properties and can withstand pressure, such as glass with a Dumet TM material melted into the glass. Such a material provides a hermetic seal, strong enough to withstand the pressures of the system. Wires 26 also pass through a passage 34 contained in a non-expanding plug 36. Non-expanding plug 36 is disposed between pressure containment cap 28 and diaphragm 12 and defines a wall of sensor chamber 14. Pressure containment cap 28, pressure vessel 18 and pressure cap 38 are welded together by welds 48 to form the housing of transducer 10.

Sensor chamber 14 is sealed with a ball seal 40 and a set screw 42 received in threaded passage 44. Silicone oil 20 and gas 22 are introduced into sensor chamber 14 through threaded passage 44. Silicone oil 20 flows completely around non-expanding plug 36 in the space formed between non-expanding plug 36, pressure containment cap 28 and pressure vessel 18.

In operation, a pressure is applied to first chamber 16 through pressure port 46, by the fluid 50 being measured. Fluid 50 can be in either a liquid or gas state. In a hydraulic application, this is a hydraulic fluid. As the fluid 50 being measured is introduced into first chamber 16, diaphragm 12 displaces, compressing gas 22 and liquid 20 in sensor chamber 14 behind diaphragm 12. Gas 22 behaves accordingly to the ideal gas law and compresses to a very small volume. When the volume gets sufficiently small, it becomes negligible and cannot compress any more. At this point in time, it is only the compressibility of liquid 20 which remains a factor in allowing any further displacement of diaphragm 12. The small compressibility of liquid 20, such as silicone oil, results in diaphragm 12 remaining stopped and unable to displace any further.

Simultaneously, a slightly slower mechanism is occurring by which gas 22, being compressed behind diaphragm 12, is dissolving into liquid 20, in accordance with Henry's law for solubility. Under Henry's law, solubility of a gas into a liquid is directly proportional to its pressure and inversely proportional to its absolute temperature. Under this mechanism, gas 22 is removed into liquid 20 during the period where the diaphragm 12 is displaced. When all of gas 22 is dissolved into liquid 20, liquid 20 resists further movement of diaphragm 12. This provides the hydraulic stop mechanism. The displacement versus output for the solubility only portion of the stop mechanism achieves a very linear mode of operation, whereas the compressibility only mechanism provides a slightly curved response which tracks the ideal gas law (i.e., $P_1 \times V_1 = P_2 \times V_2$). During actual practice the solubility mechanism can dominate over the compressibility only mechanism. In this instance, when experiencing very fast short duration pressure spikes, the compressibility mechanism will stop diaphragm 12, but upon any time duration, the solubility mechanism quickly shifts in, replacing the effects of the compressibility and linearizing the pressure displacement curve. The stopping point for the displacement of diaphragm 12 can be accurately controlled by carefully metering the ratio of gas to liquid for the volume of the stop chamber.

Figure 2A:
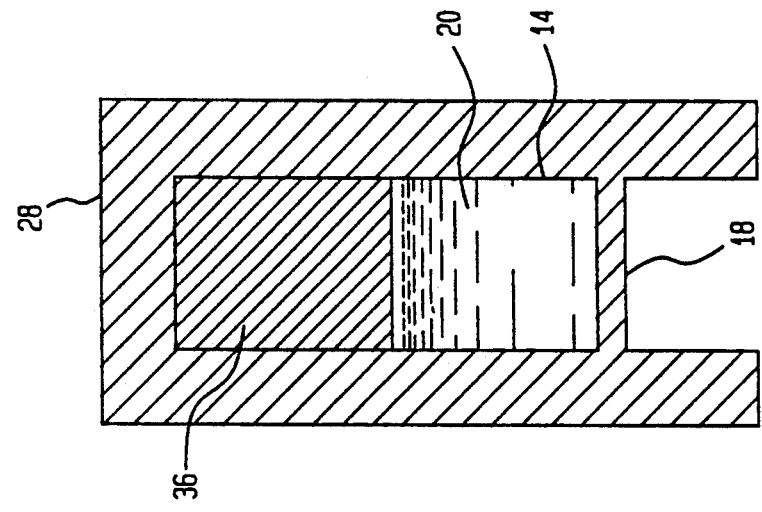
FIGS. 2(a)-2(b) show the effects of various materials used in the construction of an exemplary embodiment of a strain gauge pressure sensing transducer with hydraulic stop mechanism in accordance with the present invention.
Figure 2B:
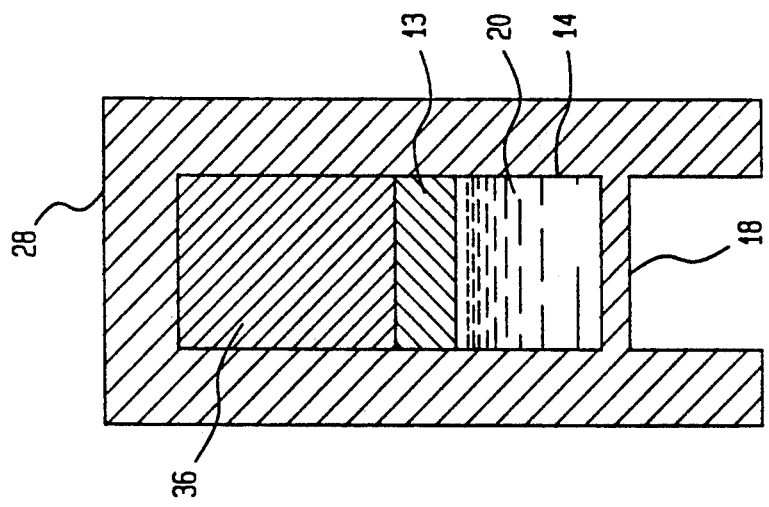

Differences in the thermal expansion rates of the contained liquid 20 and the material making up the liquid/gas containment chamber of pressure sensor vessel 18 can result in premature activation of the stop point mechanism. This problem is easily overcome by the careful selection of materials which make up this chamber. Using a pressure vessel 18 comprised of a high expansion alloy and a pressure containment cap 28, also made of a high expansion alloy, in conjunction with a non-expanding plug 36, made of a low expansion alloy, the expanded chamber volume can be made to match the expansion rate of the contained fluids, thereby eliminating thermal drift in the preset hydraulic stop point. One embodiment of the present invention uses 15-5 PH stainless steel for pressure vessel 18 and pressure containment cap 28 and SUPER INVAR TM material for the non-expanding plug 36. The coefficient of thermal expansion for a liquid 20 will typically be 100 times or more greater than the coefficient of thermal expansion of the metals making up the pressure vessel 18 and non-expanding plug 36. Schematically, this is represented in diagrams 2a, 2b and 2c. FIG. 2a shows a liquid 20, pressure vessel 18 and non-expanding plug 36 in their normal condition, without an applied pressure. In FIG. 2b, there is shown the effect of heating upon the dimensions and volumes of the parts of transducer 10 and liquid 20. Liquid 20 has expanded under the applied pressure above its volume shown in FIG. 2a. At the same time, interference region 13 has developed. Interference region 13 occurs because the coefficient of expansion of pressure vessel 18 and non-expanding plug 36 (which are made of the same metal) are not as great as that of liquid 20. This interference region creates a pressure which forces the gas bubbles (not shown) into a solution.

Figure 2C:
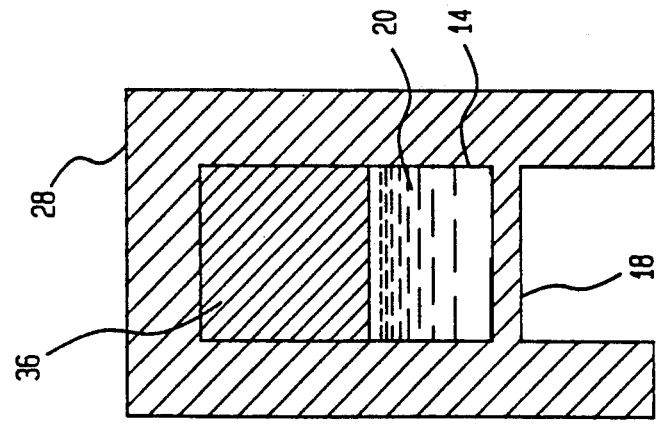

FIG. 2c shows a pressure vessel 18 and non-expanding plug 36 made of different materials. In this instance, non-expanding plug 36 has been made of SUPER INVAR TM material, a metal with an extremely small coefficient of thermal expansion. When heat is applied and pressure chamber 14 expands with fluid 20, the SUPER INVAR TM non-expanding plug 36 does not. Accordingly, there is an effective growth in sensor chamber 14 in accordance with the expansion of liquid 20. By careful selection of dimensions, this sensor chamber 14 volume growth can be matched to the liquid volume growth so that a generated pressure is not imposed upon the contained liquid 20. This eliminates the problem of thermal instability in the hydraulic stop mechanism.

Those skilled in the art will appreciate other materials which can be used to provide the abovementioned desired properties.

Figure 3A:
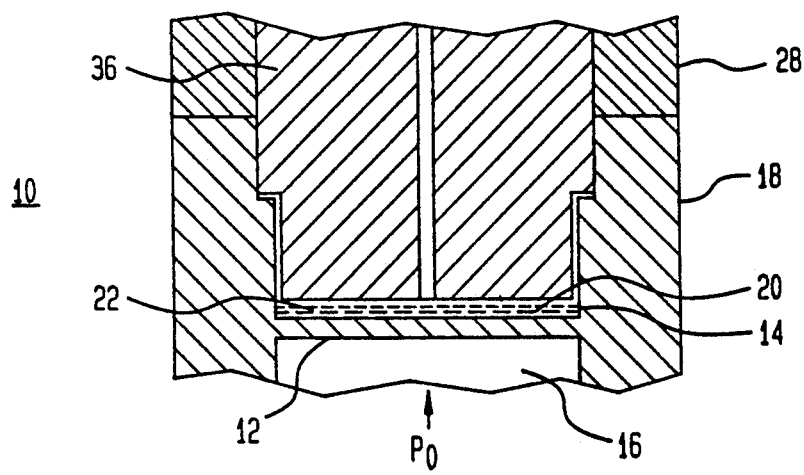
FIGS. 3(a)-3(c) show the operation of an exemplary embodiment of a strain gauge pressure sensing transducer with hydraulic stop mechanism in accordance with the present invention.
Figure 3B:
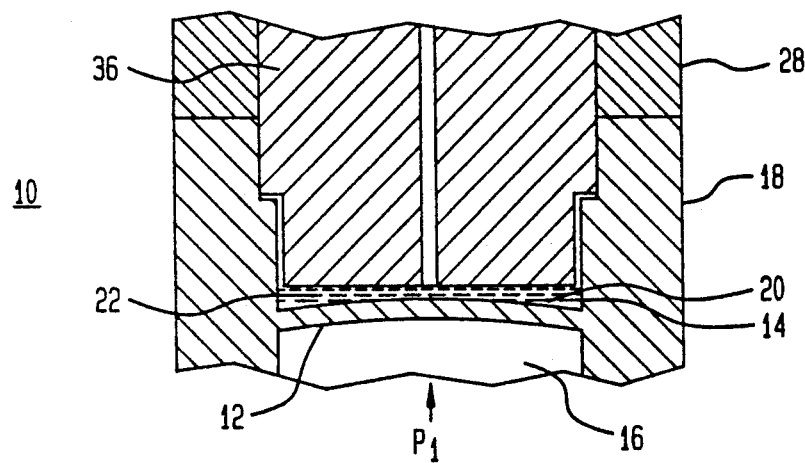
Figure 3C:
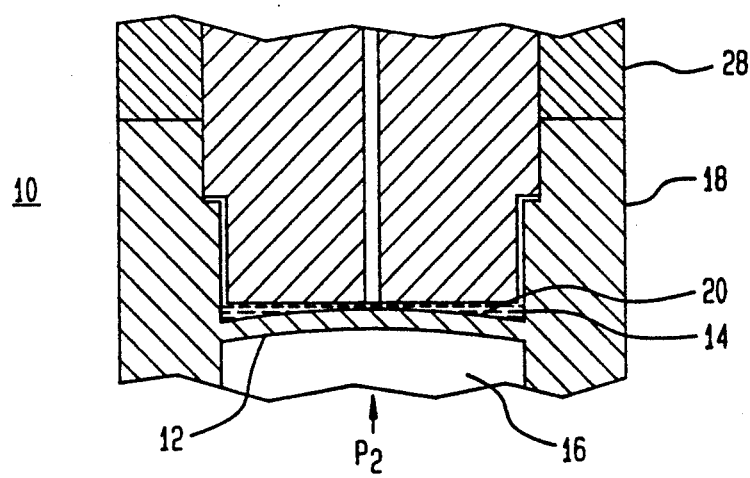

There is shown in FIGS. 3a, 3b and 3c an expanded view of the diaphragm area of pressure transducer 10. FIGS. 3a-3c illustrate the application of pressure and the subsequent compression of gas 22 into silicone oil 20. FIG. 3a shows pressure transducer 10 in its initial unloaded state, with $P_0$ representing no pressure applied. Gas 22 is shown as a spherical bubble located in silicone oil 20 within sensor chamber 14. In this view, it can be seen that a gap exists between non-expanding plug 36 and pressure vessel 18.

There is shown in FIG. 3b an intermediate stage of pressure loading, wherein a pressure $P_1$ is applied to diaphragm 12 via a fluid 50 in pressure chamber 16. As pressure $P_1$ is applied to diaphragm 12, diaphragm 12 becomes displaced into sensor chamber 14. Gas 22 and silicone oil 20 begin to compress, reducing the available volume inside sensor chamber 14. This increased pressure inside sensor chamber 14 increases the solubility of gas 22 into liquid 20 and gas 22 begins to dissolve into liquid 20, further reducing the available volume of gas in sensor chamber 14. As pressure $P_1$ is maintained against diaphragm 12, pressure continues to increase in pressure chamber 14. This continues until the solubility of gas 22 into silicone oil 20 reaches a point at which gas 22 is fully dissolved into silicone oil 20. When this state of fully dissolved gas 22 is reached, a gas bubble is no longer present, leaving only liquid. Because the liquid is nearly incompressible, increased pressure $P_2$ at this point has only a minimal effect upon the displacement of diaphragm 12. Any further pressure is resisted by the structure of the pressure vessel itself. This is shown in FIG. 3c.

Figure 4:
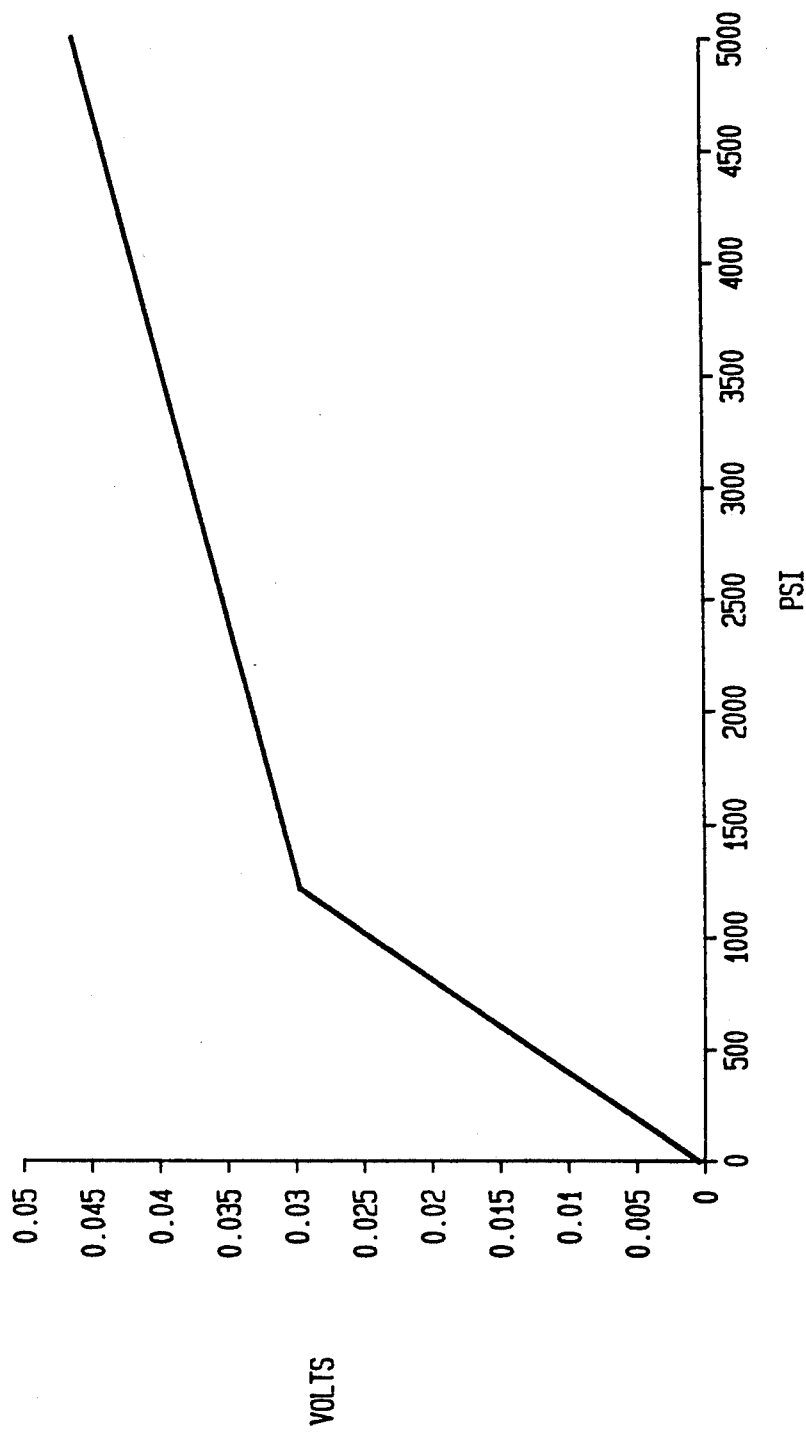
FIG. 4 is a graph showing pressure characteristics of an exemplary embodiment of a strain gauge pressure sensing transducer with hydraulic stop mechanism in accordance with the present invention.

There is shown in FIG. 4 a graphical representation of an example application of pressure transducer 10. The graph shows the increased voltage output as pressure is increased. In FIG. 4, the voltage output begins to level off just beyond 1000 PSI. This corresponds to the full compression of gas 22, and it is dissolving into liquid 20 at just beyond 1000 PSI. At this point, the substantially incompressible nature of liquid 20 yields a minimal voltage output upon further pressure. In such an example, pressure transducer 10 would be acting as a stop mechanism for pressures beyond that level just above 1000 PSI until the rated pressure of the stop mechanism is reached. As pressure is increased, however, damage to diaphragm 12 will not occur because of the form-fitting stop achieved by liquid 20 upon gas 22 being fully dissolved.

Figure 5:
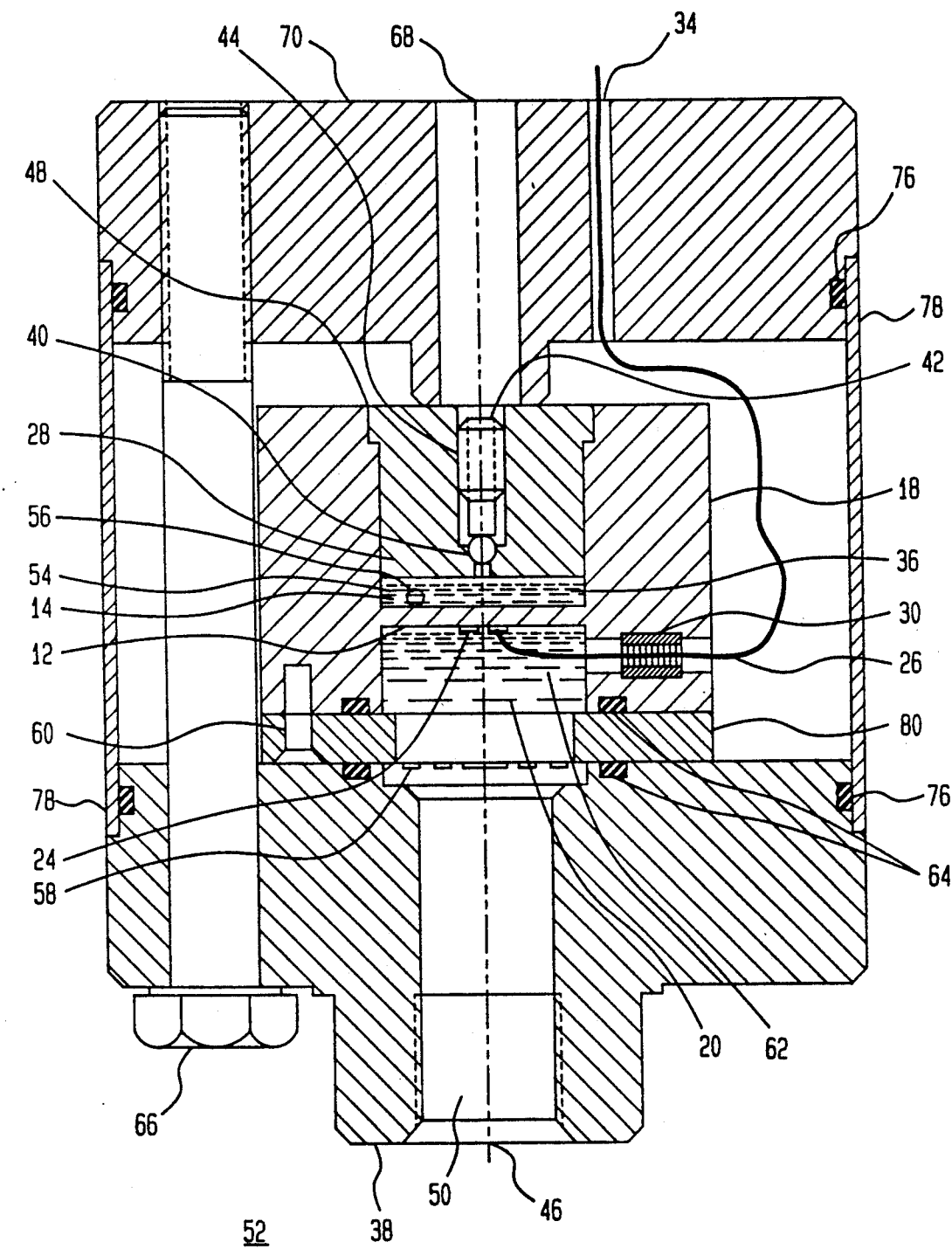
FIG. 5 is an additional embodiment of a strain gauge pressure sensing transducer with hydraulic stop mechanism in accordance with the present invention.

There is shown in FIG. 5 a strain gauge pressure sensing transducer 52, which is an additional embodiment of the present invention. Although the mechanism of pressure sensing transducer 52 is similar to that shown in FIG. 1, pressure sensing transducer 52 uses mercury liquid 54 and mercury vapor 56 as a liquid/gas system (contained in a second chamber 14). In this embodiment, the mercury gas is not dissolved into the liquid to create a solution, but rather condenses, thus adding to the liquid phase already present. Although mercury liquid and mercury vapor are used, it is understood that other substances can be used which provide the suitable liquid/vapor characteristics. The operation of pressure sensing transducer 52 is set forth below.

Pressure is applied by the fluid 50 being measured, through pressure port 46 of pressure cap 38. Pressure is transferred through a soft passive diaphragm 58 and also through a hydraulic fluid 20, such as silicon oil (contained in a third chamber 62), to an active diaphragm 12. Hydraulic fluid 20, pressure cap 38 and diaphragm 58 are sealed via o-rings 64 and then secured by bolts 66. An applied pressure deflects diaphragm 12 (the measurement diaphragm) compressing a mercury vapor 56 to cause condensation into the mercury liquid phase 54. When the vapor phase 56 of mercury 54 is depleted 100%, further movement of diaphragm 12 is no longer possible, thus preventing diaphragm damage due to excessive displacement as a result of over pressure. This is a result of mercury being a nearly incompressible liquid. Third chamber 62 is used in transducer 52 so that strain gauges 24 can be used to measure diaphragm displacement. Strain gauges 24 can not be submersed in liquid 20 contained in second chamber 14, because of the conductivity of the mercury liquid 54 contained therein. If a measurement device which is not affected by conductivity of the mercury liquid is used to measure diaphragm displacement, third chamber 62 would not be necessary. In that case, transducer 10 shown in FIG. 1 could be used with the mercury liquid/gas system.

The liquid/gas system is set up by first completely filling the sensor chamber 14 with liquid mercury 54 through fill port 68. Fill port 68 leads to threaded passage 44. Third chamber 62, formed between diaphragms 58 and 12, may be filled with a hydraulic fluid 20 (such as silicone oil) by a submersion technique, familiar to those skilled in the art. A second fill port (not shown) may be also be used to fill third chamber 62 with a hydraulic fluid 20. A ball seal and set screw arrangement, similar to ball seal 40 and set 42 could be used, if a second fill port is present. The second fill port would be positioned to access third chamber 62, possibly near feed through 30.

Pressure transducer 52 is then subjected to a preload pressure through pressure port 46. While pressure is applied, ball seal 40 and set screw 42 are seated to seal sensor chamber 14. When pressure is removed from pressure port 46, measurement diaphragm 12 will then return to its nearly flat resting state and mercury vapor 56 will be formed inside sensor chamber 12 to fill the vacuum created within by the movement of diaphragm 12. Re-introduction of a pressure source to pressure port 46 (via first chamber 16) will reverse the process, causing mercury vapor 56 to condense into mercury liquid 54 until the point at which the stop was initially set is achieved. Movement of diaphragm 12 beyond this point is limited by the compression of the mercury liquid 54 (which is nearly incompressible), pressure containment cap 28 and pressure vessel 18, making up the sensor chamber. This limitation of movement of diaphragm 12 is further strengthen by reinforcing cap 70. Compression at this point will prevent any further gas compression or gas condensation to take place.

In this embodiment, stain gauges 24 are positioned in silicon oil 20 with transmission wire 26 passing through feed through 30. Wire 26 exits pressure transducer 52 through wire passage 34. As many wires as necessary to relay information from strain gauge sensors 24 may be used in other embodiments. Stain gauge sensors 24 measure diaphragm displacement on the concave side of diaphragm 12 when under pressure, as opposed to the embodiment shown in FIG. 1 where strain gauge sensors 24 measure displacement of the diaphragm on the convex side of diaphragm 12 when under pressure. As noted earlier, this design results from the conductivity of the mercury in sensor chamber 14.

Fill assembly screw 60 secures passive diaphragm 58 to pressure vessel 18. In this embodiment, two screws 60 are used during assembly. Screws 60 pass through passive diaphragm ring 80 to secure passive diaphragm 58. Screws 60 would be seated while submerged in a hydraulic fluid 20 if a submersion technique is used to fill third chamber 62 with hydraulic fluid 20. Bolts 66 secure pressure cap 38 and reinforcing cap 70. In this embodiment, eight bolts 66 are used to maintain a secure fit. Fewer or greater numbers of screws 60 and bolts 66 can be used to accomplish the same results. O-ring 76 maintains an environmental seal with shield tube 78 and caps 38 and 70. As in the embodiment shown in FIG. 1, the non-expanding plug 36 is made of INVAR ™ material.

Although the invention has been described in conjunction with the pressure sensing transducer, its use can be applied to other applications which seek to limit the motion of a mechanical element for example, the teachings of the present invention can be easily adapted to load cells and displacement measuring devices.

Those skilled in the art will recognized that this invention is not limited to the embodiments and applications disclosed.

What is claimed:

1. A pressure transducer for measuring the pressure of a fluid under pressure, comprising:
   a housing having a cavity therein;
   a diaphragm capable of displacement mounted within said cavity, dividing said cavity into a first and a second chamber, said first chamber adapted to receive said fluid, said second chamber containing a volume of liquid;
   means for measuring the pressure of said fluid in relation to the displacement of the diaphragm;
   sealing means for sealing said second chamber to contain said liquid; and
   a volume of gas contained in said second chamber wherein said volume of gas dissolves into said liquid when said diaphragm is displaced a first distance, said liquid and said gas being of sufficient quantity to prevent said diaphragm from displacing beyond a second distance greater than said first distance.

2. The pressure transducer of claim 1 wherein said liquid is a silicone oil.

3. The pressure transducer of claim 1 wherein said fluid is a liquid.

4. The pressure transducer of claim 1 wherein said fluid is a gas.

5. The pressure transducer of claim 1 wherein said means for measuring the pressure of said fluid comprises at least one strain gauge mounted in said second chamber and in contact with said diaphragm.

6. A pressure transducer for measuring the pressure of a fluid under pressure, comprising:
a liquid
a housing having a cavity therein;
a diaphragm capable of displacement mounted within said cavity, dividing said cavity into a first and a second chamber, said first chamber adapted to receive said fluid, said second chamber containing said liquid;
means for measuring the pressure of said fluid in relation to the displacement of said diaphragm;
sealing means for sealing said second chamber to contain said liquid; and
a volume of vapor contained in said second chamber wherein said volume of vapor condenses into said liquid when said diaphragm is displaced a first distance, said liquid and said vapor being of sufficient quantity to prevent said diaphragm from displacing beyond a second distance greater than said first distance.

7. The pressure transducer of claim 6 wherein said liquid is a metal.

8. The pressure transducer of claim 6 wherein said liquid is mercury.

9. The pressure transducer of claim 6 wherein said means for measuring the pressure of said fluid comprises at least one strain gauge mounted in said second chamber and in contact with said diaphragm.

10. The pressure transducer of claim 6 further comprising a second diaphragm, which forms a wall of a third chamber positioned between said first and said second chambers, said third chamber containing a second liquid, said second diaphragm capable of displacing in response to said pressure of said fluid and transferring substantially all of said pressure through said second liquid to said first diaphragm.

11. The pressure transducer of claim 10 wherein said second liquid is a hydraulic fluid.

12. The pressure transducer of claim 11 wherein said hydraulic fluid is a silicon oil.

13. A pressure transducer for measuring the pressure of a fluid under pressure, comprising:
a first liquid;
a second liquid;
a housing having a cavity therein;
a first diaphragm capable of displacement mounted within said first cavity, dividing said cavity into a first and a second chamber, said first chamber adapted to receive said fluid, said second chamber containing said first liquid;
a second diaphragm capable of displacement mounted within said second chamber, dividing said second chamber into a second and a third chamber, said third chamber containing said second liquid;
means for measuring the pressure of said fluid in relation to the displacement of said second diaphragm;
sealing means for sealing said first and said second chambers, respectively, to contain said first and said second liquids; and
a volume of vapor contained in said second chamber wherein said volume of vapor condenses into said liquid when said diaphragm is displaced a first distance, said liquid and said vapor being of sufficient quantity to prevent said diaphragm from displacing beyond a second distance greater than said first distance.

* * * * *